(12) United States Patent
Smith et al.

(10) Patent No.: US 11,156,939 B2
(45) Date of Patent: Oct. 26, 2021

(54) TONER LEVEL DETERMINATION AND NOTIFICATION

(71) Applicant: Hewlett-Packard Development Company, L.P., Spring, TX (US)

(72) Inventors: Kenneth K Smith, Boise, ID (US); Ji-Won Moon, Seongnam-si (KR); Min-Chul Lee, Seongnam-si (KR); Andrew Chick, Vancouver, WA (US); Matthew Storey, Austin, TX (US); Jefferson Blake West, Austin, TX (US); Zackary Thomas Hickman, Austin, TX (US); Eun-Kyung Yun, Seongnam-si (KR); Yoona Min, Seongnam-si (KR); Pratik Shah, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,347

(22) PCT Filed: Nov. 7, 2018

(86) PCT No.: PCT/US2018/059600
§ 371 (c)(1),
(2) Date: Dec. 28, 2020

(87) PCT Pub. No.: WO2020/096585
PCT Pub. Date: May 14, 2020

(65) Prior Publication Data
US 2021/0223715 A1    Jul. 22, 2021

(51) Int. Cl.
G03G 15/08    (2006.01)
G03G 15/00    (2006.01)

(52) U.S. Cl.
CPC ..... *G03G 15/0856* (2013.01); *G03G 15/0865* (2013.01); *G03G 15/556* (2013.01)

(58) Field of Classification Search
CPC .......... G03G 15/0856; G03G 15/0865; G03G 15/556; G03G 2215/0888
See application file for complete search history.

(56) References Cited

U.S. PATENT DOCUMENTS 6,144,828 A    11/2000    Sato
8,682,184 B2   3/2014     Nishikawa
(Continued)

FOREIGN PATENT DOCUMENTS

EP    2 592 481 A3    6/2017

*Primary Examiner* — Sandra Brase
(74) *Attorney, Agent, or Firm* — Jefferson IP Law, LLP (57) ABSTRACT

An image forming apparatus and method for determining a toner level and providing a notification are provided. The method of operating an image forming apparatus includes counting a number of times a lower toner hopper receives toner from an in-situ refillable upper toner hopper, calculating an estimate of toner volume transferred from the lower toner hopper to a surface of a photosensitive drum, determining an amount of toner consumed from the in-situ refillable upper toner hopper based on the number of times the lower toner hopper receives toner from the in-situ refillable upper toner hopper and the estimate of toner volume transferred from the lower toner hopper to the surface of the photosensitive drum, and generating an upper toner hopper refill notification when the amount of toner consumed from the in-situ refillable upper toner hopper is determined to exceed a threshold value.

15 Claims, 6 Drawing Sheets

(56) References Cited

U.S. PATENT DOCUMENTS

| | | |
|---|---|---|
| 8,989,635 B2 | 3/2015 | Kimura |
| 9,069,287 B2 | 6/2015 | Takahashi et al. |
| 9,523,940 B2 | 12/2016 | Hosokawa et al. |
| 9,658,569 B2 | 5/2017 | Kayahara |
| 2006/0159472 A1* | 7/2006 | Ushiroji ............ G03G 15/0872 399/27 |
| 2012/0106990 A1* | 5/2012 | Kayahara ............ G03G 15/086 399/27 |
| 2013/0223889 A1 | 8/2013 | Kato |
| 2016/0195830 A1 | 7/2016 | Seki et al. |

* cited by examiner

TONER LEVEL DETERMINATION AND NOTIFICATION

BACKGROUND

An image forming apparatus is an apparatus that performs generating, printing, receiving, transmitting, and the like of image data. Representative examples of an image forming apparatus may include a printer, a copier, a scanner, a fax machine, a multi-function printer (MFP) that integrates and realizes their functions, and the like. Printing with an image forming apparatus may utilize print particles, such as print toner or powder. For example, laser jet printing may utilize print toner, where the laser jet printer may cause toner particles to be fused to a piece of paper.

BRIEF DESCRIPTION OF THE DRAWINGS

The above and other aspects, features, and advantages of certain examples of the disclosure will be more apparent from the following description taken in conjunction with the accompanying drawings, in which.

Throughout the drawings, it should be noted that like reference numbers are used to depict the same or similar elements, features, parts, components, and structures.

DETAILED DESCRIPTION

Reference will now be made to examples, which are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted here.

As used herein, the term "and/or" includes any and all combinations of one or more of the associated listed items. Expressions such as "at least one of," when preceding a list of elements, modify the entire list of elements and do not modify the individual elements of the list.

It will be understood that, when an element is referred to as being "connected to" another element, the element can be directly connected to the other element or intervening elements may be present therebetween. When a portion "includes" an element, another element may be further included, rather than excluding the existence of the other element, unless otherwise described.

The term "image forming job" used herein may refer to image formation or various jobs (e.g., printing, copying, scanning, or faxing) related to an image, for example, creation, storage, transmission, etc. of an image file. The term "job" may refer to not only an image forming job but also a series of processes required to perform the image forming job.

In addition, the term "image forming apparatus" may refer to all apparatuses, such as a printer, a copier, a scanner, a fax machine, a multi-function printer (MFP), or a display, which are capable of performing an image forming job.

In addition, the term "print data" may refer to data converted into a format able to be printed by a printer.

In addition, the term "scan file" may refer to a file created by scanning an image in a scanner.

In addition, the term "user" may refer to a person who performs manipulations related to an image forming job by using an image forming apparatus or a device connected to the image forming apparatus in a wired or wireless manner.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

Some printing technologies utilize print particles. Print particles may include three-dimensional (3D) print powder toner. In some examples, an average diameter of 3D print powder particles of this disclosure may be less than 50 microns and/or an average diameter of toner particles of this disclosure may be less than 20 microns. It should be noted that in some examples, some print particles may be round, approximately round, or nonround. Print particles may become airborne and contaminate a local environment if not controlled. Control may be difficult when print particle bottles are supplied to an inexperienced user in an environment like an office or a homes (e.g., home offices). Flow characteristics of particles may be harder to predict than, for example, fluids. As can be observed from this discussion, devices and techniques that enable cleaner and simpler transfer of print particles may be beneficial.

In some instances, an image forming apparatus or a laser toner cartridge may have a useful life beyond the life resulting from the limited toner print particles initially contained therein. One approach to lengthening the life of the image forming apparatus or laser toner cartridge is enlarging the image forming apparatus or the laser toner cartridge to accommodate a larger initial amount of toner print particles. It may also be beneficial to replenish a container in an image forming apparatus or a laser toner cartridge with toner print particles rather than replacing the image forming apparatus or the laser toner cartridge. By replenishing the image forming apparatus or a laser toner cartridge with toner print particles the cost savings associated with larger toner print reservoirs may be maintained while preserving a smaller form factor.

Figure 1:
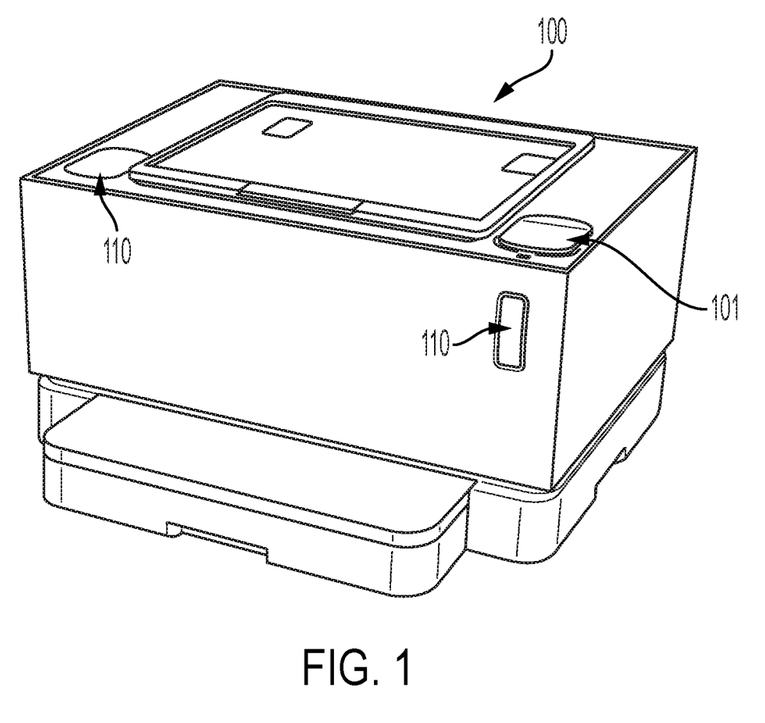
FIG. 1 includes a front side elevational view of example image forming apparatuses.

FIG. 1 includes a front side elevational view of an image forming apparatus, according to an example.

Referring to FIG. 1, an image forming apparatus 100 is an apparatus that performs generating, printing, receiving, transmitting, and the like of image data. Representative examples of an image forming apparatus may include a printer, a copier, a scanner, a fax machine, a multi-function printer (MFP) that integrates and realizes their functions, and the like.

The image forming apparatus 100, in accordance with examples of the present invention, may include an I/O unit 110 including an operation panel for receiving a user input and an illuminated toner fuel gauge. In some examples, the toner fuel gauge may be illuminated by an incandescent bulb, a light-emitting diode (LED), an organic LED (OLED), or any other suitable lighting technology.

The image forming apparatus 100, in accordance with examples of the present invention, may further include a toner replenishment port 101 mounted to an external surface of the image forming apparatus 100 to receive toner replenishment from an external toner replenishment device. While one toner replenishment port 101 on top of the image forming apparatus 100 is illustrated in FIG. 1, more than one toner replenishment port may be present on the image forming apparatus 100 in some examples and/or a toner replenishment port may be located elsewhere on image forming apparatus 100. For instance, a toner replenishment port may be present on a side of image forming apparatus 100 or on a plurality of sides of image forming apparatus 100, and/or a plurality of toner replenishment ports may be present on top of image forming apparatus 100, among other options.

Figure 2:
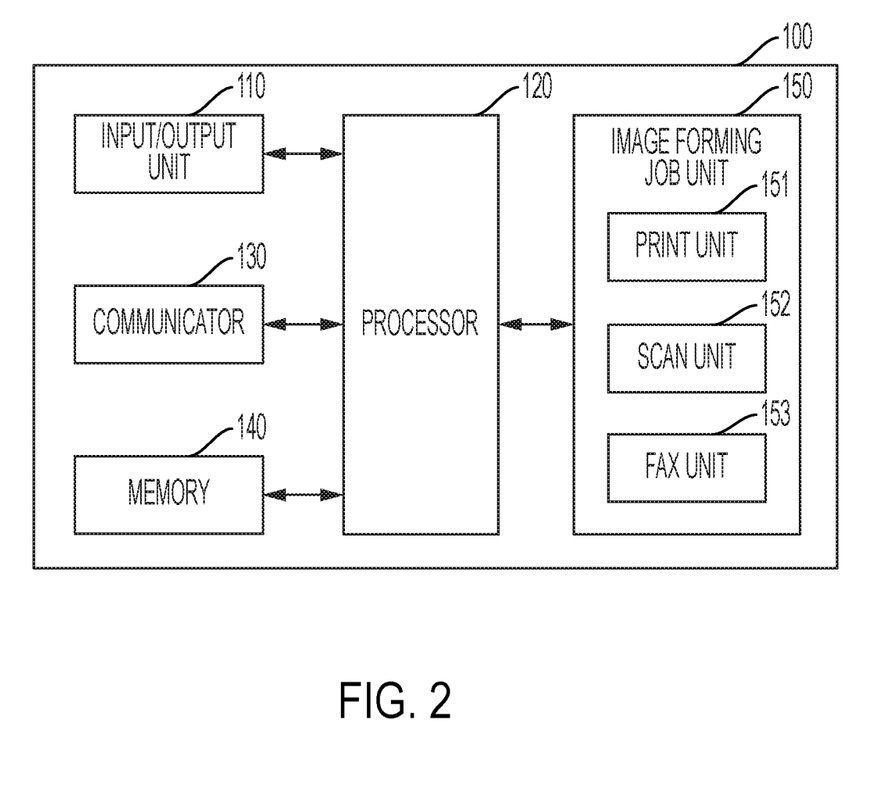
FIG. 2 includes a block diagram of a structure of an image forming apparatus according to an example.

FIG. 2 includes a block diagram of a structure of an image forming apparatus according to an example.

Referring to FIG. 2, an image forming apparatus 100 may include an input/output (I/O) unit 110, a processor 120, a communicator 130, a memory 140, and an image forming job unit 150. Although not shown, the image forming apparatus 100 may further include other components such as a power supply for supplying power to each element of the image forming apparatus 100.

The I/O unit 110 may include an input unit that receives, from a user, an input, etc. for performing an image forming job, and an output unit that displays a result of the image forming job, information regarding a state of the image forming apparatus 100, etc. For example, the I/O unit 110 may include an operation panel for receiving a user input, a display panel for showing a screen, an illuminated toner fuel gauge, etc.

As an example, the input unit may include a device, such as, a keyboard, a physical button, a touch screen, a camera, a microphone, etc., which may receive various types of user inputs. Also, the output unit may include, for example, a display panel, a speaker, etc. However, the present disclosure is not limited thereto, and the I/O unit 110 may include a device that supports various inputs and outputs.

The processor 120 may control operations of the image forming apparatus 100 and may include a processor such as a central processing unit (CPU). The processor 120 may control other elements included in the image forming apparatus 100 so as to perform operations corresponding to a user input received through the I/O unit 110.

For example, the processor 120 may execute a program stored in the memory 140, read a file stored in the memory 140, store a new file in the memory 140, etc.

The communicator 130 may perform wired/wireless communication with another device or a network. To this end, the communicator 130 may include a communication module, such as a transceiver, that supports at least one of various wired/wireless communication methods. For example, the communication module may be a chipset, a sticker/a barcode (e.g., a sticker including a near field communication (NFC) tag), etc. including information required for communication.

The wireless communication may include, for example, at least one of Wireless Fidelity (Wi-Fi), Wi-Fi Direct, Bluetooth, Ultra Wide Band (UWB) and NFC. The wired communication may include, for example, at least one of a universal serial bus (USB) and a wired local area network (LAN) (Ethernet).

The communicator 130 may be connected to an external device outside the image forming apparatus 100 and may receive/transmit signals or data from/to the external device. The communicator 130 may transmit signals or data received from the external device to the processor 120 or may transmit signals or data generated in the processor 120 to the external device. For example, when the communicator 130 receives a print command signal and print data from the external device, the processor 120 may output the received print data through a print unit 151.

Programs such as applications and data such as files may be installed and stored in the memory 140. The processor 120 may access and use the data stored in the memory 140 or may store new data in the memory 140. Also, the processor 120 may execute the programs installed in the memory 140 and may install, in the memory 140, applications externally received through the communicator 130. In some examples the memory 140 may be non-volatile memory. For instance, non-volatile memory may include read-only memory, electrically erasable programmable read-only memory (EEPROM), flash memory, ferroelectric RAM, hard disk drives, and solid state drives, and other kinds of suitable memory.

The image forming job unit 150 may perform an image forming job such as printing, scanning, copying, or faxing.

Still referring to FIG. 2, the image forming job unit 150 includes the print unit 151, a scan unit 152, and a fax unit 153. However, according to necessity, the image forming job unit 150 may include only some of the print unit 151, the scan unit 152, and the fax unit 153 or may further include an element that performs another image forming job.

The print unit 151 may form an image on a recording medium by using various printing methods such as an electrophotography method, an inkjet method, a thermal transfer method, a thermosensitive method, and the like. In an example, the print unit 151 may print an image on the recording medium through a series of processes including an exposing process, a developing process, a transfer process, and a fusing process. The print unit 151 will be further described with reference to FIG. 3.

Figure 3:
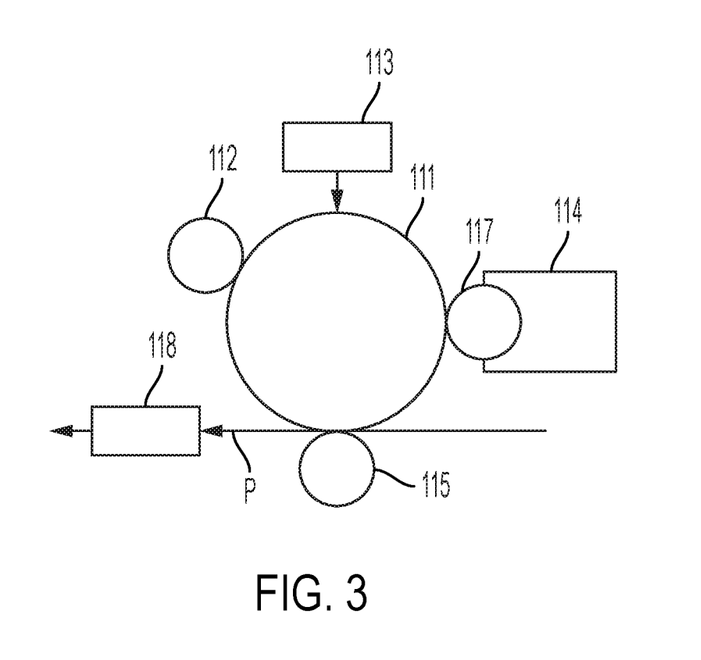
FIG. 3 includes a block diagram of a structure of an image forming apparatus according to another example.

FIG. 3 includes a block diagram of a structure of a print unit according to an example.

Referring to FIG. 3, the image forming apparatus 100 may include a photosensitive drum 111, a charger 112, an exposure unit 113, a developing unit 114, a transfer unit 115, and a fuser 118.

The image forming apparatus 100 may further include a feeding means (not shown) that feeds a recording medium P. An electrostatic latent image is formed on the photosensitive drum 111. The photosensitive drum 111 may be referred to as a photosensitive drum, a photosensitive belt, or the like according to a shape thereof.

Hereinafter, for convenience of description, elements of the image forming apparatus 100 corresponding to one color will be described. However, the image forming apparatus 100 may include a plurality of photosensitive drums 111, a plurality of chargers 112, a plurality of exposure units 113, and a plurality of developing units 114 corresponding to a plurality of colors, and an intermediate transfer belt.

The charger 112 charges a surface of the photosensitive drum 111 with a uniform potential. The charger 112 may be realized as a type such as a corona charger, a charging roller, a charging brush, or the like.

The exposure unit 113 forms the electrostatic latent image on the surface of the photosensitive drum 111 by changing a surface potential of the photosensitive drum 111 according to image information that is to be printed. For example, the exposure unit 113 may form the electrostatic latent image by irradiating modulated light, using a LED or laser, onto the photosensitive drum 111 according to the image information that is to be printed. The exposure unit 113 having this type may be referred to as a photoscanner and use a LED as a light source.

The developing unit 114 houses a developer therein and develops the electrostatic latent image as a visible image by supplying the electrostatic latent image with the developer. The developing unit 114 may include a developing roller 117, a toner print particle reservoir that supplies the electrostatic latent image with the toner print particles, and a supply roller to transfer toner from the toner print particle reservoir. For example, the toner print particles may be supplied from the developing roller 117 to the electrostatic latent image formed on the photosensitive drum 111 through a developing electric field formed between the developing roller 117 and the photosensitive drum 111.

The visible image formed on the photosensitive drum 111 is transferred onto the recording medium P by the transfer unit 115 or the intermediate transfer belt (not shown). The transfer unit 115 may transfer the visible image onto the recording medium P according to an electrostatic transfer method. The visible image may stick onto the recording medium P by an electrostatic attraction.

The fuser 118 fuses the visible image on the recording medium P by applying heat and/or pressure to the visible image on the recording medium P. A print job is completed through a series of processes described above.

The developer described above is used whenever an image forming job is performed and thus is exhausted if being used for a preset time or more. In this case, a unit (e.g., the developing unit 114 described above) that stores the developer may be newly replaced. Parts or elements that may be replaced in a process of using the image forming apparatus 100 as described above may be referred to as consumable units or replaceable units. Also, a memory (or a Customer Replaceable Unit Monitoring (CRUM) chip) may be attached to such a consumable unit in order to appropriately manage the corresponding consumable unit.

A motor (not shown) may perform an operation of rotating the respective elements of the print unit described above. One motor may simultaneously rotate a plurality of elements of the print unit described above or a plurality of motors may be combined to rotate the plurality of elements described above.

Referring again to FIG. 2, the scan unit 152 may irradiate light onto a document and may read an image recorded on the document by receiving light reflected from the document. A charge coupled device (CCD), a contact type image sensor (CIS), or the like may be used as an image sensor that reads the image from the document. The scan unit 152 may have a flatbed structure, in which a document is fixed at a certain location and an image is read from the document by a moving image sensor, a document-feed structure, in which an image sensor is fixed at a certain location and a document is moved relative thereto, or a combination thereof.

The fax unit 153 may share an element for scanning an image with the scan unit 152 and may share an element for printing a received file with the print unit 151. The fax unit 153 may transmit a scanned file to a destination or may externally receive a file.

Figure 4:
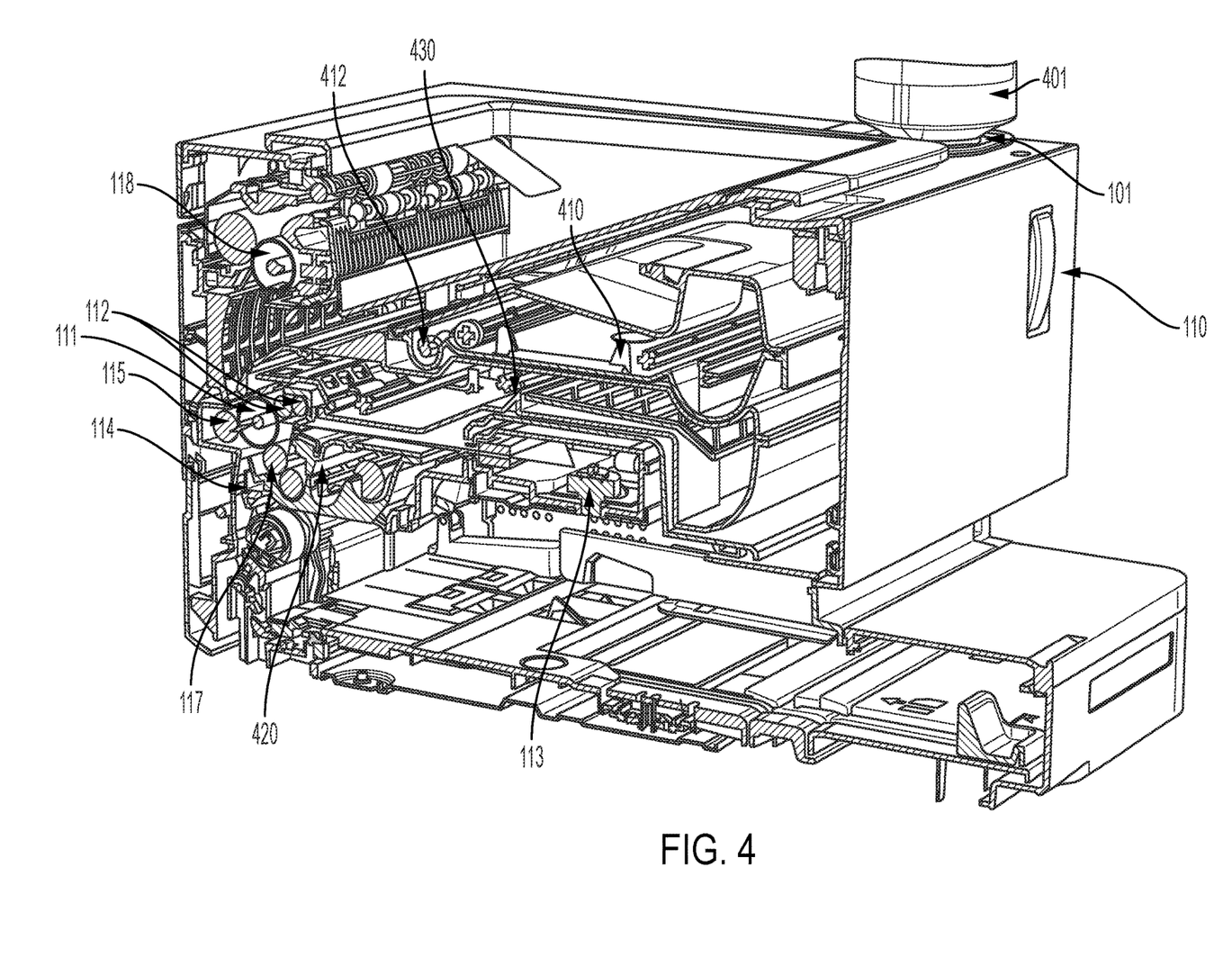
FIG. 4 includes a cross-sectional elevation view of an example image forming apparatus according to another example.

FIG. 4 includes a cross-sectional elevation view of an image forming apparatus according to an example.

In certain instances, a laser toner cartridge of an image forming apparatus 100 may have a useful life beyond that of a single reservoir of toner. Accordingly, it may be beneficial to replenish the reservoir in a laser toner cartridge with toner rather than replacing the laser toner cartridge.

Referring to FIG. 4, a laser toner cartridge of the image forming apparatus 100 may include an in-situ refillable upper toner hopper 410. The in-situ refillable upper toner hopper 410 may store toner until toner replenishment is needed by a lower toner hopper 420. The in-situ refillable upper toner hopper 410 may be connected to the toner replenishment port 101 mounted to an external surface of the image forming apparatus 100 to receive toner replenishment from an external toner replenishment device 401. A volume of the in-situ refillable upper toner hopper 410 may be larger than a volume of the lower toner hopper 420. For instance, the in-situ refillable upper toner hopper 410 may be initially filled with toner sufficient for the printing of 5000 pages, while the lower toner hopper 420 provides toner directly to the developing roller 117 and may be initially filled with toner sufficient for the printing of 1000 pages, for example.

The external toner replenishment device 401 may be a container that holds toner for supplying (e.g., transfer or delivery) to a toner cartridge of the image forming apparatus 100. Examples of the external toner replenishment device 401 include containers, bottles, and the like. The external toner replenishment device 401 may contain and/or transfer toner print particles. For example, the external toner replenishment device 401 may be designed to interface with a toner cartridge of the image forming apparatus 100 via the toner replenishment port 101 mounted to an external surface of the image forming apparatus 100.

The in-situ refillable upper toner hopper 410 may provide toner to the lower toner hopper 420 of the developing unit 114 in response to a lower toner hopper replenishment signal. The lower toner hopper replenishment signal may be based on a signal produced by an optical sensor located in the lower toner hopper 420 which detects the presence of toner in the lower toner hopper. When the toner level of the lower toner hopper 420 is insufficient to trigger the optical sensor, the lower toner hopper replenishment signal may be generated.

In response to receiving the lower toner hopper replenishment signal, print functions of the image forming apparatus may be interrupted and a mechanical toner transport 412 may activate to physically move toner from the in-situ refillable upper toner hopper 410 to the lower toner hopper 420. In some instances, the mechanical toner transport 412 may be an auger that pushes toner into a conduit connecting the in-situ refillable upper toner hopper 410 with the lower toner hopper 420. In other instances, the mechanical toner transport 412 may be a belt or any other suitable mechanical device that can move toner from one area to another.

When the in-situ refillable upper toner hopper 410 has provided toner print particles such that the toner level of the lower toner hopper 420 is sufficient to trigger the optical sensor, the mechanical toner transport 412 is stopped and print functions of the image forming apparatus 100 are continued without interruption.

After the visible image formed on the photosensitive drum 111 is transferred onto the recording medium P by the transfer unit 115, the photosensitive drum 111 is cleaned of any particles (i.e., waste toner) and the photosensitive drum is again charged for continuing operations. The particles of waste toner are transferred from the photosensitive drum to a waste toner hopper 430. In certain examples, a volume of the waste toner hopper 430 may be larger than a volume of the in-situ refillable upper toner hopper 410 to accommodate the particles of waste toner incident to multiple instances of refilling or recharging of the in-situ refillable upper toner hopper 410 by one or more external toner replenishment devices 401. For instance, the waste toner hopper 430 may be large enough to accommodate the particles of waste toner produced in the printing of 25,000-30,000 pages.

Still referring to FIG. 4, the image forming apparatus 100 may include an illuminated toner fuel gauge as part of the I/O unit 110. The illuminated toner fuel gauge may indicate an estimate of the toner remaining in the in-situ refillable upper toner hopper 410 based on a known starting volume of toner in the in-situ refillable upper toner hopper 410, the number of times the lower toner hopper receives toner from the in-situ refillable upper toner hopper, and the estimate of toner volume transferred from the lower toner hopper to the surface of the photosensitive drum.

Figure 5:
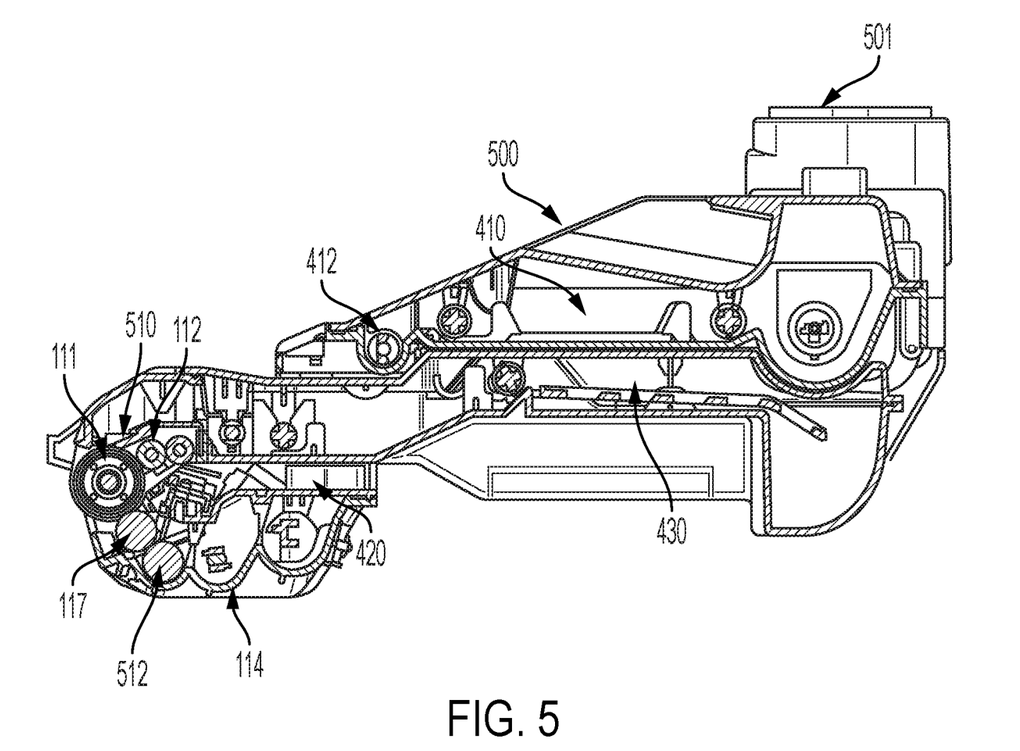
FIG. 5 includes a cross-sectional side view of an example laser toner cartridge of an image forming apparatus.

FIG. 5 includes a cross-sectional side view of a laser toner cartridge of an image forming apparatus according to an example.

FIG. 5 illustrates a laser toner cartridge 500 including a toner replenishment snorkel 501 which functionally couples to the toner replenishment port 101 of the image forming apparatus 100. The toner replenishment snorkel 501 allows toner print particles to be supplied from the external toner replenishment device 401 to the in-situ refillable upper toner hopper 410 of the laser toner cartridge 500.

Laser toner cartridge 500 of the image forming apparatus 100 may include the in-situ refillable upper toner hopper 410, the lower toner hopper 420 the mechanical toner transport 412, where the mechanical toner transport 412, including an auger, may push toner into a conduit connecting the in-situ refillable upper toner hopper 410 with the lower toner hopper 420, the photosensitive drum 111, a cleaning member 510 to remove waste toner from a surface of the photosensitive drum 111, the waste toner hopper 430 to collect the waste toner from the cleaning member 510, the charger 112, and the developing unit 114, where the developing unit 114 includes, the developing roller 117, the lower toner hopper 420 (i.e., a toner print particle reservoir that supplies the electrostatic latent image with the toner print particles), and a supply roller 512 to transfer toner from the lower toner hopper 420.

As shown in FIG. 5, the volume of the in-situ refillable upper toner hopper 410 may be larger than the volume of the lower toner hopper 420, and the volume of the waste toner hopper 430 may be larger than the volume of the in-situ refillable upper toner hopper 410.

Figure 6:
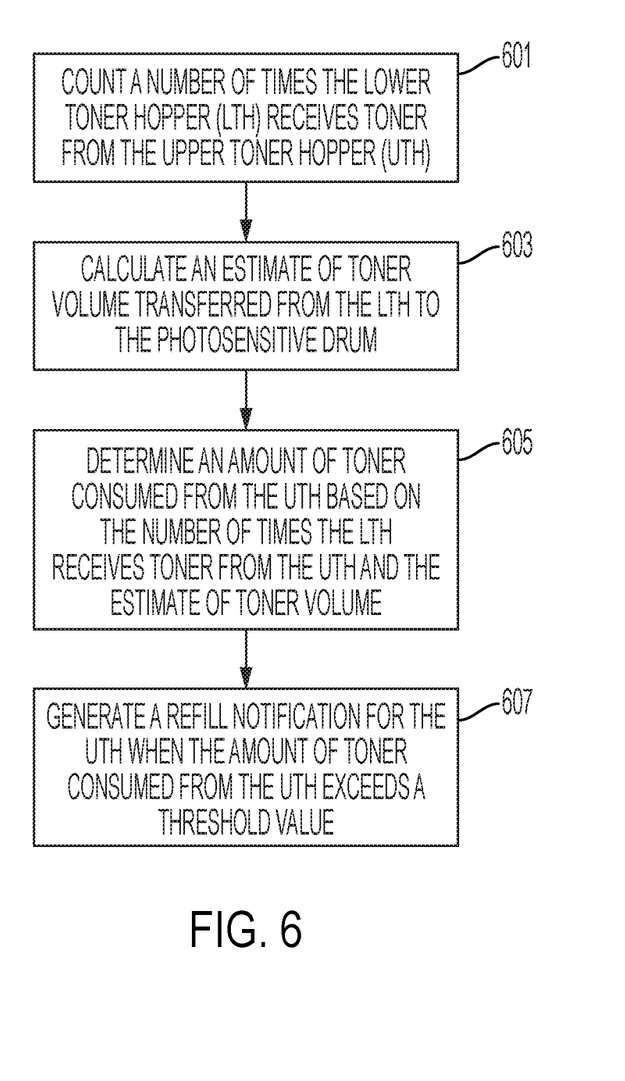
FIG. 6 includes a flow diagram illustrating an example of a method for generating an upper toner hopper refill notification.

FIG. 6 includes a flow diagram illustrating an example of a method for generating an upper toner hopper refill notification.

Referring to FIG. 6, at least one processor 120 counts a number of times the lower toner hopper 420 receives toner from the in-situ refillable upper toner hopper 410, at operation 601. For example, the at least one processor 120 may instantiate a counter that tracks each time a signal is generated based on the optical sensor resulting in the mechanical toner transfer transferring toner from the in-situ refillable upper toner hopper 410 to the lower toner hopper 420.

At operation 603, the at least one processor 120 calculates an estimate of toner volume transferred from the lower toner hopper 420 to the photosensitive drum 111. The at least one processor 120 may calculate an estimate of toner volume transferred from the lower toner hopper 420 to the surface of the photosensitive drum 111 by estimating an amount of time a laser applies energy to the photosensitive drum and geometric shapes created by the applied energy. For example, the geometric shapes created by the applied energy may be represented by two dots positioned side-by-side, two dots with space in between, and a long runs of dots. Furthermore, the at least one processor 120 may estimate the geometric shapes in a horizontal and vertical direction.

At operation 605, the at least one processor 120 determines an amount of toner consumed from the in-situ refillable upper toner hopper 410 based on the number of times the lower toner hopper 420 received toner from the in-situ refillable upper toner hopper 410 and the estimate of toner volume transferred from the lower toner hopper 420 to the surface of the photosensitive drum 111.

At operation 607, the at least one processor 120 generates an upper toner hopper refill notification when the amount of toner consumed from the in-situ refillable upper toner hopper 410 is determined to exceed a threshold value. For example, the threshold value may generate the refill notification when the at least one processor 120 determines that the amount of toner consumed from the in-situ refillable upper toner hopper 410 exceeds half of the toner originally available in the in-situ refillable upper toner hopper 410. For instance, when the in-situ refillable upper toner hopper 410 originally includes sufficient toner to print 5,000 pages, the threshold value may be 2,500 pages. In other examples, the threshold value of toner may correspond to the volume toner provided by a standard external toner replenishment device 401.

While the present disclosure has been described with reference to the drawings and particular examples, those of ordinary skill in the art may make various changes and modifications therein without departing from the spirit and scope of the present disclosure. For example, the described techniques may be performed in a different order than the described method, and/or the described components such as systems, structures, devices, and circuits may be united or combined in a different form than the described method or may be replaced or substituted by other components or equivalents thereof.

What is claimed is:

1. An image forming apparatus, comprising:
an in-situ refillable upper toner hopper;
a developer to develop an electrostatic latent image formed on a photosensitive drum, using toner, the developer comprising a lower toner hopper to receive the toner from the in-situ refillable upper toner hopper via a mechanical toner transport;
a cleaning member to remove waste toner from a surface of the photosensitive drum;
a waste toner hopper to collect the waste toner from the cleaning member;
non-volatile memory; and
at least one processor, in electrical communication with the non-volatile memory, to:
count a number of times the lower toner hopper receives toner from the in-situ refillable upper toner hopper,
calculate an estimate of toner volume transferred from the lower toner hopper to the surface of the photosensitive drum,
determine an amount of toner consumed from the in-situ refillable upper toner hopper based on the number of times the lower toner hopper receives toner from the in-situ refillable upper toner hopper and the estimate of toner volume transferred from the lower toner hopper to the surface of the photosensitive drum, and
generate an upper toner hopper refill notification when the amount of toner consumed from the in-situ refillable upper toner hopper is determined to exceed a threshold value.

2. The image forming apparatus of claim 1, wherein a volume of the in-situ refillable upper toner hopper is larger than a volume of the lower toner hopper.

3. The image forming apparatus of claim 1, wherein the in-situ refillable upper toner hopper is connected to a toner replenishment port mounted to an external surface of the image forming apparatus to receive toner replenishment from an external toner replenishment device.

4. The image forming apparatus of claim 1, wherein the mechanical toner transport comprises an auger to drive the toner from the in-situ refillable upper toner hopper to the lower toner hopper of the developer via a toner channel.

5. The image forming apparatus of claim 4, wherein the developer further comprises an optical sensor to measure a presence of toner available in the lower toner hopper.

6. The image forming apparatus of claim 5, wherein the at least one processor further generates a control signal to the auger to supply toner from the in-situ refillable upper toner hopper when the optical sensor measures an insufficient amount of toner available in the lower toner hopper.

7. The image forming apparatus of claim 1, wherein the at least one processor further calculates the estimate of toner volume transferred from the lower toner hopper to the surface of the photosensitive drum by calculating an amount of time a laser applies energy to the photosensitive drum and geometric shapes created by the applied energy.

8. The image forming apparatus of claim 7, wherein the developer further comprises:
a supply roller to transfer toner from the lower toner hopper, and
a developing roller to transfer toner from the supply roller to the charged areas or discharged areas of the photosensitive drum.

9. The image forming apparatus of claim 1, wherein a volume of the waster toner hopper is larger than a volume of the in-situ refillable upper toner hopper.

10. The image forming apparatus of claim 1, further comprising a physical user interface including a light emitting diode (LED) illuminated toner fuel gauge, wherein the generating of the upper toner hopper refill notification comprises displaying a toner level on the toner fuel gauge with a blinking illumination.

11. A method of operating an image forming apparatus, the method comprising:
counting a number of times a lower toner hopper receives toner from an in-situ refillable upper toner hopper;
calculating an estimate of toner volume transferred from the lower toner hopper to a surface of a photosensitive drum;
determining an amount of toner consumed from the in-situ refillable upper toner hopper based on the number of times the lower toner hopper receives toner from the in-situ refillable upper toner hopper and the estimate of toner volume transferred from the lower toner hopper to the surface of the photosensitive drum; and
generating an upper toner hopper refill notification when the amount of toner consumed from the in-situ refillable upper toner hopper is determined to exceed a threshold value.

12. The method of claim 11, wherein the calculating of the estimate of toner volume transferred from the lower toner hopper to the surface of the photosensitive drum comprises estimating an amount of time a laser applies energy to the photosensitive drum and geometric shapes created by the applied energy.

13. The method of claim 11, wherein the generating of the upper toner hopper refill notification comprises displaying a toner level on a toner fuel gauge with a blinking illumination.

14. The method of claim 11, further comprising:
measuring, via an optical sensor located in the lower toner hopper, a presence of toner available in the lower toner hopper.

15. The method of claim 14, further comprising:
generating a control signal to an auger to supply toner from the in-situ refillable upper toner hopper to the lower toner hopper when the optical sensor measures an insufficient amount of toner available in the lower toner hopper.

* * * * *